US006646851B1

United States Patent
Gudat

(10) Patent No.: US 6,646,851 B1
(45) Date of Patent: Nov. 11, 2003

(54) CIRCUIT ARRANGEMENT FOR OPERATING A SOLENOID ACTUATOR

(75) Inventor: Wolfgang Gudat, Seelze (DE)

(73) Assignee: Wabco GmbH & Co. OHG, Hannover (DE)

(*) Notice: Subject to any disclaimer, the term of this patent is extended or adjusted under 35 U.S.C. 154(b) by 233 days.

(21) Appl. No.: 09/612,890

(22) Filed: Jul. 10, 2000

(30) Foreign Application Priority Data

Jul. 9, 1999 (DE) .......................................... 199 31 972

(51) Int. Cl.$^7$ .............................................. H01H 47/00
(52) U.S. Cl. ..................... 361/160; 361/115; 318/254
(58) Field of Search ......................... 318/254; 361/160, 361/115

(56) References Cited

U.S. PATENT DOCUMENTS

| | | | |
|---|---|---|---|
| 4,442,395 A | * 4/1984 | Salina et al. ................. 320/134 |
| 5,119,010 A | * 6/1992 | Shirata et al. ............... 320/110 |
| 5,168,190 A | * 12/1992 | Bahn ........................... 310/166 |
| 5,357,395 A | * 10/1994 | Bissell et al. ................. 361/92 |
| 5,532,526 A | 7/1996 | Ricco et al. |
| 5,703,456 A | 12/1997 | Cox |
| 5,907,466 A | * 5/1999 | Dressler et al. ............. 361/156 |

FOREIGN PATENT DOCUMENTS

| | | |
|---|---|---|
| EP | 0 694 664 A1 | 1/1996 |
| EP | 1 039 625 A2 | 9/2000 |
| JP | 07154906 | 6/1995 |
| NL | 8801697 | 2/1990 |

* cited by examiner

Primary Examiner—Brian Sircus
Assistant Examiner—Isabel Rodriguez
(74) Attorney, Agent, or Firm—Proskauer Rose LLP

(57) ABSTRACT

A circuit arrangement for operating a solenoid actuator, for example, an electric motor provided in the form of a switched reluctance motor, permits operation of the motor in the event of malfunction or failure of part of an energy supply. The circuit arrangement advantageously includes an auxiliary battery serving as a redundance in addition to a main battery. The auxiliary battery is smaller and has a lower nominal voltage than the main battery. In order to permit continued operation of the electric motor in the event of failure, with a nominal operating voltage which is adapted to the nominal voltage of the main battery, a capacitor which can be switched on and off is connected in series to the batteries. An energy quantity can be accumulated in the capacitor by switching the current switching through an exciter winding of the electric motor in the manner of a switching regulator, whereby the nominal voltage of the capacitor finally exceeds the voltage in the auxiliary battery. When a sufficient quantity of energy has been accumulated, the electric motor can be actuated for a short time by means of the energy accumulated in the capacitor. Electrically actuated braking systems in commercial vehicles represent a significant and preferred area of application for the invention.

32 Claims, 6 Drawing Sheets

CIRCUIT ARRANGEMENT FOR OPERATING A SOLENOID ACTUATOR

BACKGROUND OF THE INVENTION

The invention relates to a circuit arrangement for operating a solenoid actuator, and more particularly, a circuit arrangement in which an energy feed-back device is located between an energy supply device and the actuator for feeding back an energy quantity stored in the actuator into the energy supply -device to provide supplementary operating power as needed.

A circuit arrangement of this type is disclosed, for example, in U.S. Pat. No. 5,432,420 issued to Bahn. The disclosed circuit arrangement operates a solenoid actuator provided in the form of an electric motor, in particular, a switched reluctance motor or a brushless D.C. motor. Motors of this type are provided with a stator having several exciter windings, and a rotor located therein made of a magnetic material, or one which can be magnetized. By feeding electric current sequentially to the exciter winding, a rotary field is created inside the stator which causes the rotor to rotate. In order to attain a rotational speed of the rotor suitable for practical use, the exciter windings must be subjected to current at relatively brief time intervals. Since the inductive behavior of the exciter winding causes a relatively slow rise in current at first, and then a relatively slow drop in current, without additional measures being taken, the operation of motors of this type is relatively inefficient.

In order to achieve efficient operation, each exciter winding of the electric motor is connected to a capacitor which serves as an energy storage in the above-mentioned circuit arrangement. When the exciter winding is switched off, two diodes cause a pole-dependent feed-back of the energy stored in the exciter winding, in the form of a current, into the corresponding capacitor, so that increased voltage is built up therein as compared with the nominal operating voltage of the circuit arrangement. In the next actuating step of the electric motor, this energy, which is stored in the capacitor, is transferred to the next exciter winding which is to be subjected to voltage, in order to improve the effectiveness of the electric motor.

In the power supply of solenoid actuators, such as, an electric motor or a valve actuated by an electric motor, a battery used to provide the power may have a defect, for example, a short circuit between the electrodes of the battery, resulting in a reduction in available voltage. It is also possible that the battery may fail completely. For such instances, and in particular with regard to safety-relevant systems, such as those used in a vehicle, an auxiliary battery may be provided. For economic reasons, a relatively small battery with a relatively low nominal voltage is preferably used as the auxiliary battery.

In such cases, however, because of the reduced operating voltage, the solenoid actuator may produce an insufficient actuating force for the situation for which it is intended. This could have far-reaching and undesirable consequences in a safety-relevant system.

It is therefore an object of the present invention to provide a circuit arrangement for the operation of a solenoid actuator capable of producing sufficient actuating force to ensure safe operation even in the event of an insufficient power supply to the actuator.

SUMMARY OF THE INVENTION

In accordance with this and other objects of the invention, there is provided a circuit arrangement for operating a solenoid actuator which includes an electrical energy supply device and a first switching device via which the actuator is connectable to the electrical energy supply device. An energy feed-back device is provided between the energy supply device and the actuator for feeding back an energy quantity stored in the actuator into the energy supply device when the first switching device is opened. The energy supply device includes at least one energy output device and at least one energy storage for transmitting and receiving energy. A second switching device is also provided, via which the energy storage is connectable to the energy feed-back device, such that a desired energy reserve is accumulated step by step in the energy storage by an alternating opening and closing of the first and the second switching devices.

The invention provides the advantage that, in comparison with the state of the art, no additional components, such as a separate inductor, are required. As a result, the invention can be implemented very economically. In particular, no additional inductance device or coil is required to collect the energy reserve in the energy storage, such as is required, for example, in a circuit regulator according to known voltage supply technology, since the inductance of one or several exciter windings of the solenoid actuator is utilized directly in accordance with the invention.

In order to accumulate a desired energy reserve in the energy storage, only an alternating opening and closing of the first and second switching devices is required. The desired energy reserve can be built up by means of the number of opening and closing cycles, depending on the application, and can later be transferred to the actuator to increase the actuating force. Depending upon the storage capacity of the energy storage and of the actuator, and depending upon the operating voltage of the energy supply system, a greater or lesser number of opening and closing cycles may be required. This must be adapted as a function of each particular special application.

The invention provides the further advantage that even when an operating voltage is much lower than the normal operating voltage, it is still possible to operate the actuator, and the actuator is still able to function as long as any operating voltage is still present. As a result, an especially high degree of operating safety is achieved.

When applying the invention in combination with an energy supply system with several batteries used as energy supply devices, for example, a main battery serving as main energy supply device and an auxiliary battery provided as a redundancy, it is also possible to use a relatively small battery as compared with the main battery with considerably less voltage, so that the energy supply system can be produced at relatively low cost.

Furthermore the invention can also be used advantageously for the temporary increase of the actuating force of the actuator, for example, when a greater actuating force is needed for a short period of time than can be attained by the operation of the actuator with the normal operating voltage of the energy supply system.

In an advantageous embodiment of the invention, the first switching system is actuated in such manner in the energy storage mode that the actuator essentially executes no actuating movement. Depending upon the actuator, this can also be achieved, for example, through a relatively short actuation of the first switching device or, in case of actuators of a different type, also by switching on one or several very specific exciter windings of the actuator for a longer period of time as required.

If, for example, a switched reluctance motor is used as the actuator, the first switching means can be actuated preferably in such manner that the exciter winding of the reluctance motor with stator poles closest to the rotor poles is connected to the energy supply system. In such case, the reluctance motor does not execute any substantial movement. It is an additional advantage, in this case, that the previously mentioned exciter winding has the highest inductance of all exciter windings of the reluctance motor due to the position of the rotor, so that the accumulation of the energy reserve in the energy storage can take place at a relatively high speed.

Depending on the design of the reluctance motor, or of some other electric motor, it may also be advantageous to connect several or all exciter windings at the same time to the energy supply system, such that when the first switching means has been opened, the energy quantities from several or all exciter windings is stored in the energy storage, so that the accumulation of the energy reserve in the energy storage is thus accelerated further.

It is another advantage of the invention that when an electric motor with several exciter windings is used, only a single energy storage, for example, a capacitor, is required. For this reason, the invention can be particularly economical in its implementation.

The above, and other objects, features and advantages of the present invention will become apparent from the following description read in conjunction with the accompanying drawing, in which like reference numerals designate the same elements and signals.

DETAILED DESCRIPTION OF THE PREFERRED EMBODIMENT

Figure 1:
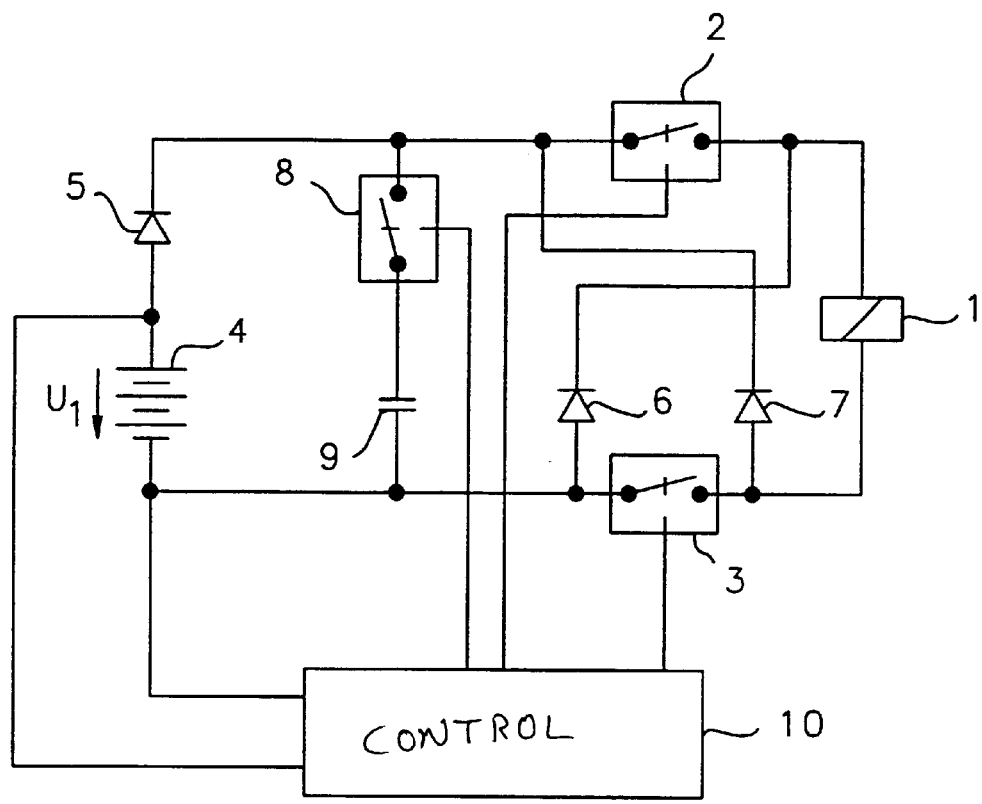
FIG. 1 is a schematic electrical diagram of a first embodiment of the invention, which is suitable for any type of solenoid actuator.

Referring now to the figures, and in particular FIG. 1, a first embodiment of the invention is depicted, which is suitable for any type of solenoid actuator, such as, for example, solenoid valves, relays or electric motors. A solenoid actuator 1, is symbolically represented in FIG. 1, in the form of a relay coil.

The actuator 1 is connectable via a first switching device 2, 3 to an energy supply device 4, 5, 8, 9. The energy supply device 4, 5, 8, 9 is provided, in the depicted embodiment, with a battery 4, a diode 5, a switch 8 serving as a second switching device, and a capacitor 9 used as an energy storage. The battery 4 and the diode 5 serve as energy supply devices. The first switching device 2, 3 includes a first switch 2 and a second switch 3. The switches 2, 3 symbolize suitable electrical or electronic components with switching functions, such as, for example, semi-conductor switches, preferably field effect transistors. However, any kind of other component providing switching function can be used which meets the existing requirements for the application of the invention.

The switch 8 and the diode 5 are connected to the first switch 2. The capacitor 9 is connected in series with the switch 8. A battery 4, with a nominal voltage $U_1$, is connected in series with the diode 5. The battery 4 and the capacitor 9 are in turn connected to the second switch 3.

To achieve bridging and directional reversal of current when the switches 2, 3 are open, an energy feed-back arrangement 6, 7, consisting of two diodes, is provided. In such arrangement, the diode 7 connects the connection of the switch 3 on the side of the actuator 1 to the connection of the switch 2 on the side of the circuit in the direction of flow. The diode 6 connects the connection of the switch 3 on the side of the circuit to the connection of switch 2 on the side of the actuator 1 in the direction of flow.

The energy feed-back arrangement 6, 7 serves to feed back an energy supply stored in the solenoid actuator 1 into the capacitor 9, whereby the direction of current in the conduits going from the switches 2, 3 to the capacitor 9 are reversed from the direction of current when the switches 2, 3 are switched on, in order to maintain the polarity given by the battery 4.

The switches 2, 3, 8 each have a control connection, through which a respective switch can be opened or closed by means of a control signal. To produce the control signals for the switches 2, 3, 8, a control module 10 is provided, which is connected via conduits to the control inputs of the switches 2, 3, 8. The control module 10 is additionally connected to the battery 4 for current supply.

A charge can be accumulated in the capacitor 9 in the circuit arrangement according to FIG. 1, and can be supplied when required to the actuator 1 by alternatingly switching the first switching device 2, 3 on and off, and the second switch 8 on, as shall be explained in further detail below through a time diagram. Immediately following closure of switches 2, 3 of the first switching device as a result of control signals of the control module 10, a current flows from the battery 4 through the diode 5, acting in a direction of flow, through the switch 2, the actuator 1 and the switch 3. If no energy is yet stored in the capacitor 9, the control module 10 also actuates the switch 8, so that the capacitor 9 is charged to the battery voltage $U_1$, which is reduced by the diode flow voltage of the diode 5. The switches 2, 3 are then opened. The energy quantity (0.5 *inductance* current$^2$), stored in the actuator 1 as a result of the inductance of the actuator, now flows off through the diodes 6, 7 into the side of the circuit away from the actuator 1. The diode 5, which is now acting in the blocking direction, prevents a flow of current into the battery 4. The energy quantity flowing off therefore flows via the closed second switch 8 into the capacitor 9 which stores this energy quantity.

Following this, the switch 8 is opened, and the switches 2, 3 are closed. As a result, a flow of current through the actuator 1 builds up again, so that a stored energy quantity can again flow off via the diodes 6, 7 once the switches 2, 3 have been switched off. After such opening of the switches 2, 3, the switch 8 is immediately closed, such that this energy quantity can again be stored in the capacitor 9.

Once a sufficient energy quantity is stored in the capacitor 9, it can be supplied to the actuator 1 in order to increase the actuating force through simultaneous closing of the switches 2, 3, 8.

Figure 2:
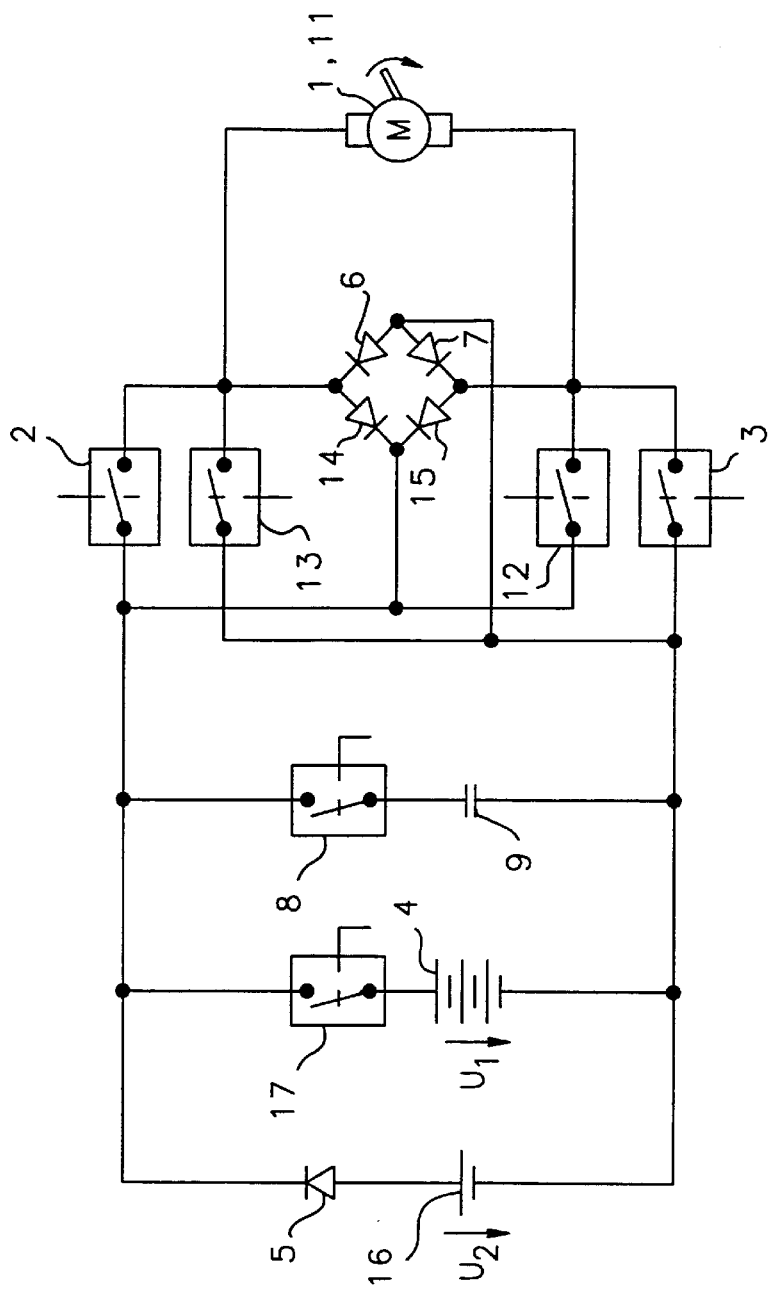
FIG. 2 is a schematic electrical diagram of a second embodiment of the invention, which is particularly advantageous for D.C. motors with collectors being used as actuators.

FIG. 2 shows a second embodiment of the invention which is particularly well suited for the utilization of D.C. motors with a collector serving as the actuator, whereby the D.C. motor can be operated in both directions of rotation.

The first switching device, described with reference to FIG. 1 above, consists in this second embodiment of four switches 2, 3, 12, 13. In this case, the switches 2, 3 are arranged in a manner analogous with the circuit arrangement of FIG. 1. The switches 12, 13 are used to reverse the voltage polarity on the actuator I which, in this embodiment, is provided in the form of a D.C. motor 11. Therefore, either the switches 2, 3, or the switches 12, 13, are switched on, depending on the desired direction of rotation of the D.C. motor 11.

The energy feed-back arrangement consisting of the diodes 6, 7 in FIG. 1 includes an additional two diodes 14, 15 in the embodiment according to FIG. 2. The four diodes 6, 7, 14, 15 of the energy feed-back device are arranged in accordance with the embodiment in the manner of a bridge rectifier, so that an energy quantity flowing off after the opening of the switches 2, 3, 12, 13 is supplied to the capacitor 9 with the polarity of the battery 4, irrespective of the voltage polarity on the D.C. motor 11.

The energy supply device 4, 5, 8, 9, described above with reference to FIG. 1, is provided in this embodiment of the invention additionally with an auxiliary energy supply device 5, 16 comprising a battery 16 and the diode 5. The battery 4, which is to be assigned in this embodiment to a main energy supply device 4, 17, is installed upstream in the form of a switch 17 serving as an additional switching device. The battery 4 is connectable via the switch 17 to the first switching device 2, 3, 12, 13.

The battery 16 is smaller in size, and thus less expensive than the battery 4. For this reason, the battery 16 has a lower nominal voltage $U_2$ than the battery 4.

For purposes of greater clarity, depiction of the control module in FIG. 2 is omitted, and the switches 2, 3, 8, 12, 13, 17 are connected to the control module in a manner similar to that described with reference to FIG. 1.

The auxiliary battery 16 serves as a redundant source of energy for the electric motor 11 in the event of a defect or failure of the battery 4. In a preferred operating mode of the circuit arrangement according to FIG. 2, the electric motor 11, with a nominal voltage that is preferably adapted to the nominal voltage $U_1$ of the battery 4, is supplied exclusively from the battery 4 in the event of trouble-free operation of the battery 4. The switches 8, 17 are always closed in this operating state.

When it has been determined that the battery 4 is defective, i.e., when the battery 4 is no longer able to supply sufficient energy, it is separated from the remaining circuit arrangement by opening the switch 17. An energy quantity is then accumulated in the capacitor 9 in the above described manner by alternately switching the switches 2, 3 or 12, 13 on and off, and the switch 8 on. In this case, the diode 5 serves to prevent the energy from flowing off into the battery 16. An energy back-flow into the defective battery 4 is prevented by the open switch 17. Instead of the diode 5, it is therefore also possible to use an additional controlled switch which could be actuated in synchronicity with the switches 2, 3, or 12, 14.

When the voltage which has resulted from the accumulation of energy quantity in the capacitor 9, and which is measured and evaluated in the control module 10 in a manner not shown here, has reached a sufficient value in the capacitor 9 to actuate the D.C. motor 11, the energy quantity from the capacitor is supplied to the D.C. motor 11 by closing the switches 2, 3, 8, or 8, 12, 13, thus causing the D.C. motor 11 to move. The switch 17 continues to remain permanently open in such case. Upon transfer of the energy from the capacitor 9 to the D.C. motor 11, the process of energy accumulation in the capacitor 9 is resumed.

Figure 3:
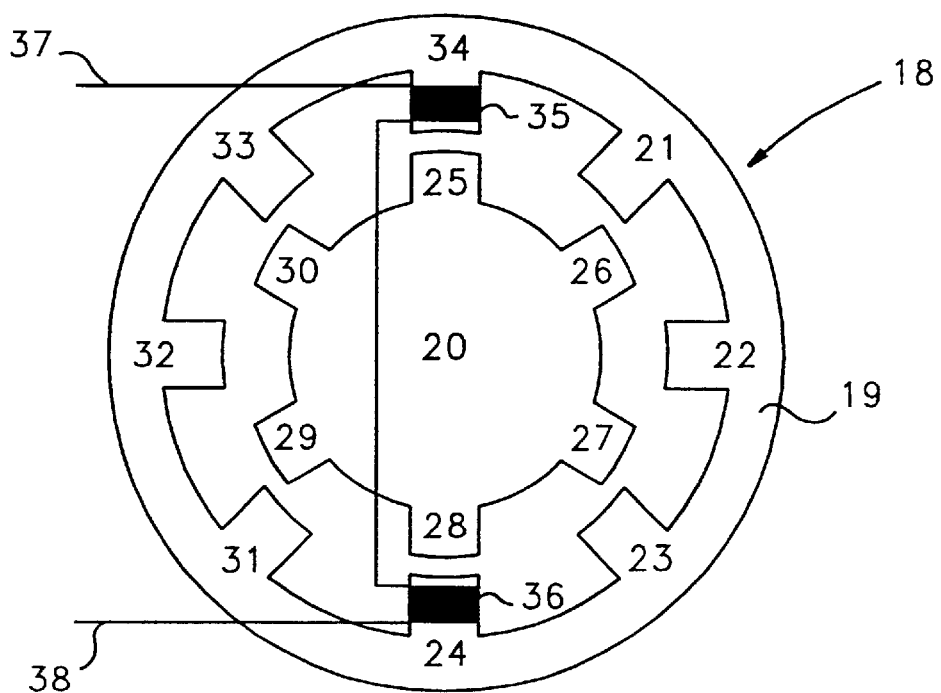
FIG. 3 is a schematic cross-sectional view taken through a switched reluctance motor.

FIG. 3 schematically depicts a cross-section through a switched reluctance motor 18. The reluctance motor 18 has eight stator poles 21, 22, 23, 24, 31, 32, 33, 34 evenly distributed over the circumference of the inside of a stator 19, as well as six rotor poles 25, 26, 27, 28, 29, 30 evenly distributed over the outer circumference of a rotor 20 located in the stator 19. The rotor 20 is mechanically connected to the output shaft of the reluctance motor 18.

The stator poles facing each other are associated in pairs, i.e., the following pairs: 21 and 31, 22 and 32, 23 and 33, 24 and 34. An electric coil winding is located at each stator pole. The coil windings of two stator poles forming a pair constitute one exciter winding. The coil windings of an exciter winding are connected to each other in such manner that when the exciter winding is subjected to current, a magnetic flow is produced in the same sense as in the stator poles belonging to one and the same pair. The combination of two coil windings 35, 36 into one exciter winding is shown in FIG. 3 through the stator poles 24, 34 as an example. The stator pole 24 is, in the depicted example, provided with the coil 36, and the stator pole 34 is provided with the coil 35. The connecting conduits 37, 38 are provided to supply electric current to the exciter winding 35, 36. For the sake of simplification, the coils on the other stator poles are not shown in FIG. 3.

By feeding current to a particular exciter winding, for example, to the exciter winding on the stator poles 21, 31, the rotor 20 can be moved further, in steps, by one twenty-fourth of a circle, i.e., from the position shown in the example of FIG. 3, to a position at which the stator pole 21 is aligned with the rotor pole 26, and the stator pole 31 is aligned with the rotor pole 29. By feeding current sequentially to the other coils, the rotor 20 can be moved further by one additional step at a time, i.e., by one twenty-fourth of a circle.

Figure 4:
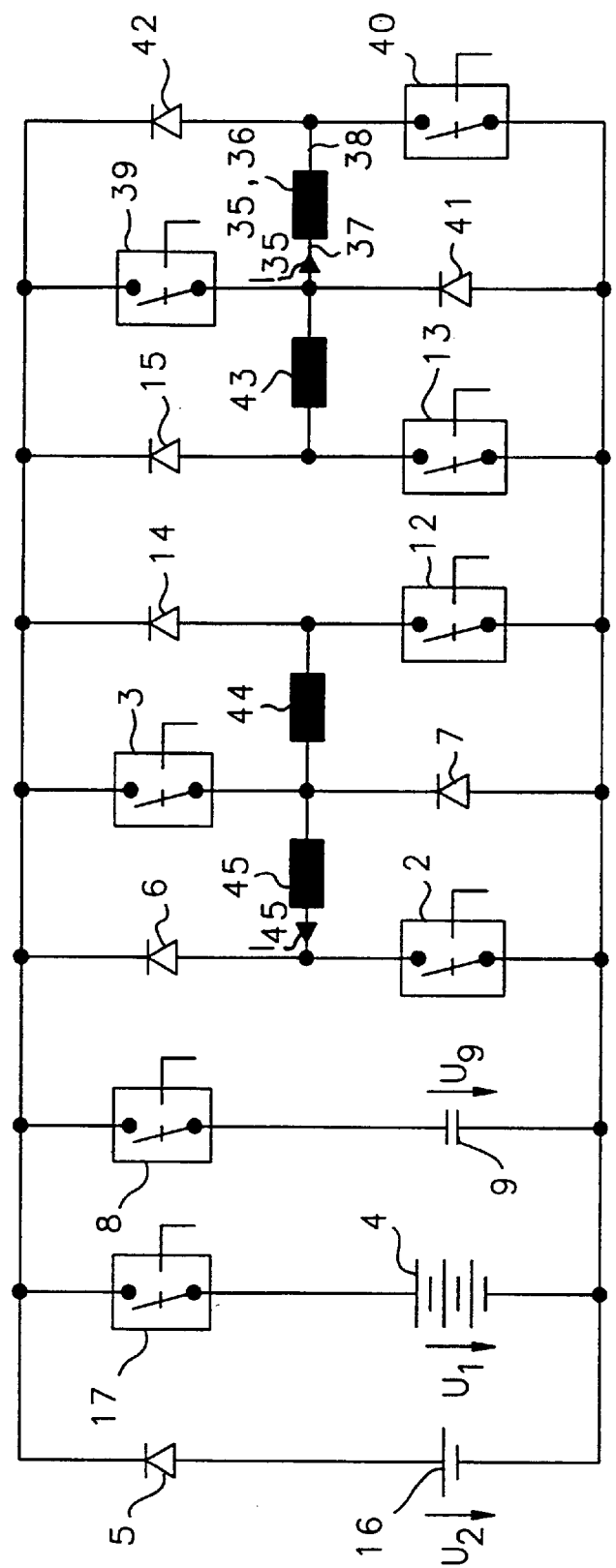
FIG. 4 is a schematic electrical diagram of a third embodiment of the invention, which is particularly advantageous where a switched reluctance motor is used as the actuator.

In FIG. 4, a third embodiment of the invention is shown, which is particularly advantageous for use with the reluctance motor 18 described with respect to FIG. 3. In FIG. 4, only the exciter windings of the stator poles 21, 22, 23, 24, 31, 32, 33, 34, as well as the connecting conduits 37, 38 of the reluctance motor 18, are shown. The exciter windings are shown in the present embodiment in the form of individual coils or exciter windings 35/36, 43, 44, 45, for the sake of simplification.

In addition to the parts 4, 5, 6, 9, 16, 17 already explained with reference to FIGS. 1 and 2, the switches 2, 3, 12, 13, 39, 40 comprising the first switching device, and the diodes 6, 7, 14, 15, 41, 42 comprising the energy feed-back arrangement, are placed in this embodiment of the invention in a particularly advantageous manner, such that the expenditure in components is relatively lower than the complexity of the actuator 1, 18 employed in the embodiment. In particular, two switches and two diodes are not required for every exciter winding 35, 36, 43, 44, 45.

Depending on the current position of the rotor 20, and the desired direction of rotation of the reluctance motor 18, two switches of the first switching device 2, 3, 12, 13, 39, 40 are actuated in pairs in order to thereby supply one of the exciter windings 35, 36, 43, 44, 45 with current. In order to supply current to the exciter windings 35, 36, for example, the switches 39, 40 must be switched on. This causes a current 135 to be generated. In order to generate a movement step of the reluctance motor 18 from the position shown in FIG. 3 in a counterclockwise direction, the switches 2, 3 must be actuated, which causes a current flow $I_{45}$ to pass through the exciter winding 45.

As long as the battery 4 is free of defects, the switches 8, 17 remain closed. If a defect occurs in the battery 4, the switch 17 is opened permanently.

The previously described method for the accumulation of a quantity of energy in the capacitor 9 and its supply to the actuator 18 is then applied.

If the switches 39, 40 are initially closed in this process, the energy stored in the exciter winding 35, 36 then flows off via the diodes 41, 42 and via the then closed switch 8 into the capacitor 9 once this switch is opened. The switch 17 is then opened, as mentioned before. When an energy quantity in the capacitor 9 has reached a level which is sufficient for a movement step of the reluctance motor 18, this energy quantity is transferred, for example, to the exciter winding 45, for which the switches 2, 3, 8 would have to be closed. Upon completion of the movement step, the switches 2, 3 are opened, causing the energy quantity stored in the exciter winding 45 to flow off again, via the diodes 6, 7, into the capacitor 9.

In a preferred embodiment of the invention, it is always the exciter winding of the reluctance motor 18 where the stator poles are aligned closest with the rotor poles that is supplied with current for the accumulation of an energy quantity in the capacitor 9 needed for a movement of the motor in the event of failure of the battery 4. This provides the advantage that the inductance of this exciter winding is especially high and that a particularly large quantity of energy can therefore be stored therein. A further advantage is that the reluctance motor 18 is not set in motion accidentally during the accumulation of the energy quantity in the capacitor 9.

In another advantageous embodiment of the invention, all of the exciter windings 35, 36, 43, 44, 45 are simultaneously supplied with current, i.e., all of the switches 2, 3, 12, 13, 39, 40 of the first switching device are closed for the purpose of utilizing as high an inductance as possible, and thereby as high an energy storage capacity in the coils as possible. Furthermore, an accidental movement of the reluctance motor 18 is also avoided. Upon opening of the switches 2, 3, 12, 13, 39, 40 and closing of the switch 8, the energy quantities stored in the exciter windings 35, 36, 43, 44, 45 can then be stored in the capacitor 9.

As with FIG. 2, neither the control module nor the connecting conduits going from the control module to the control inputs of the switches 2, 3, 8, 12, 13, 17, 39, 40 are shown in FIG. 4.

Figure 5:
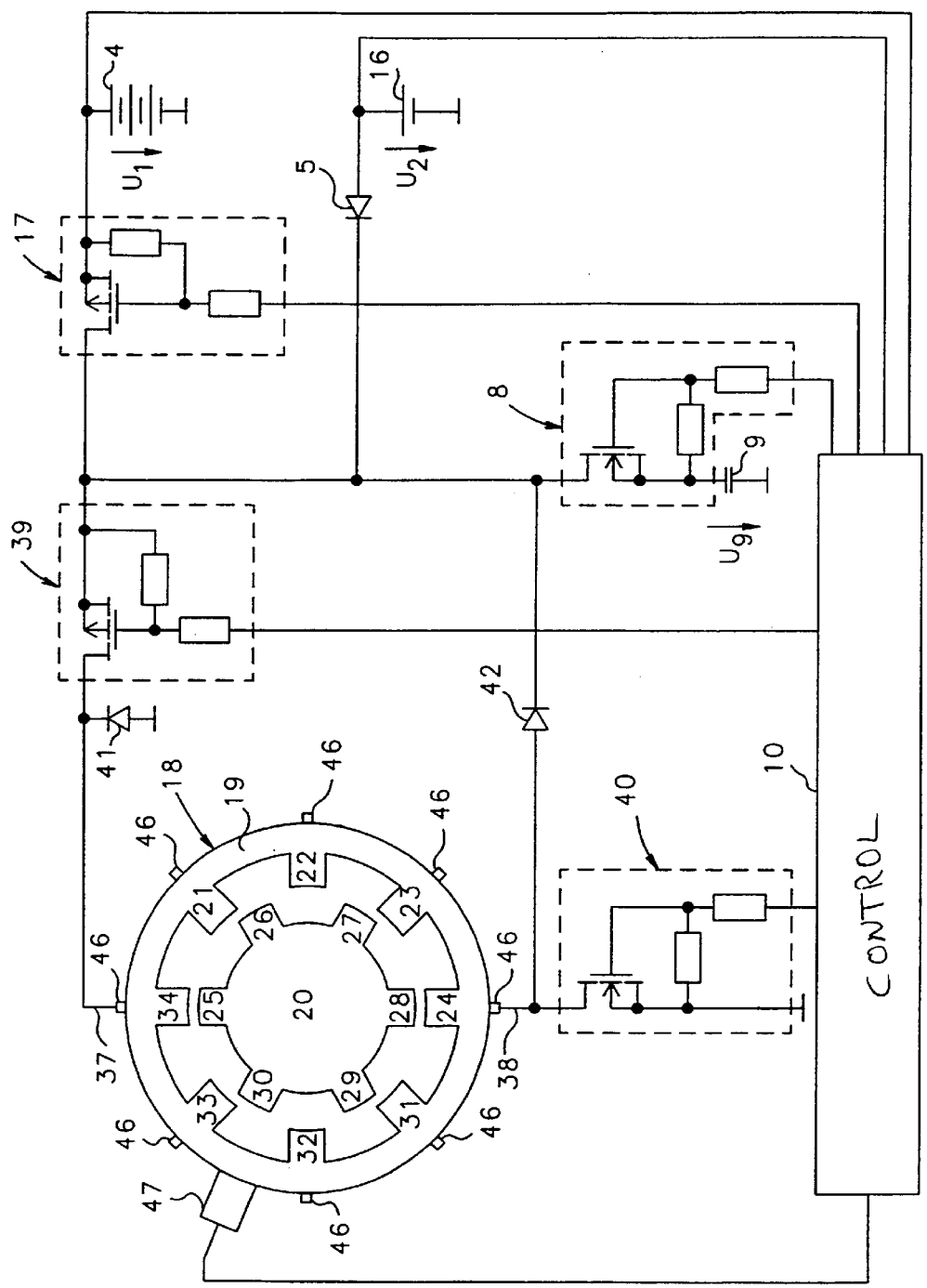
FIG. 5 is a schematic diagram of a variant of the third embodiment of the invention, with a switched reluctance motor as the actuator.

FIG. 5 shows a preferred variant of the third embodiment of the invention shown in FIG. 4, with the switched reluctance motor 18 as the actuator. In this instance as well, an advantageous circuitry of the components previously indicated as switches 2, 3, 8, 12, 13, 17, 39, 40 is indicated next to the control module 10. For the sake of simplification, only the circuit elements of the exciter windings 34, 24 not shown in FIGS. 3 and 4 are shown in detail. The exciter windings 34, 24 can be supplied with current through the connecting conduit 37, 38 which is connected to the connection contacts 46 of the reluctance motor 18. The other exciter windings 43, 44, 45 (see FIG. 4) are connected to additional connection conduits via additional connection contacts 46 (exciter windings and connecting conduits are also not shown in FIG. 5).

Each of the switches 8, 17, 39, 40 shown in FIG. 5 consists of a field-effect transistor with a pre-resistance at the gate connection, as well a bridging resistance between the respective gate connection and the corresponding source connection.

The bridging resistance serves to ensure a defined switching state of the field-effect transistor in the event that the control module 10 emits a high-ohmic signal to the gate pre-resistance.

In addition, FIG. 5 illustrates that a position sensor 47, connected to the control module 10, is installed on the stator 19 of the reluctance motor 18. From the signal of the position sensor 47, the control module 10 is able to detect the angular position of the rotor 20, and can therefore find a suitable exciter winding for the next movement step of the rotor 20.

In all other respects the circuit arrangement of FIG. 5 is identical with that of FIG. 4.

A suitable size of the capacitor 9 is, for example, approximately 1000 to 5000 $\mu F$.

Figure 6:
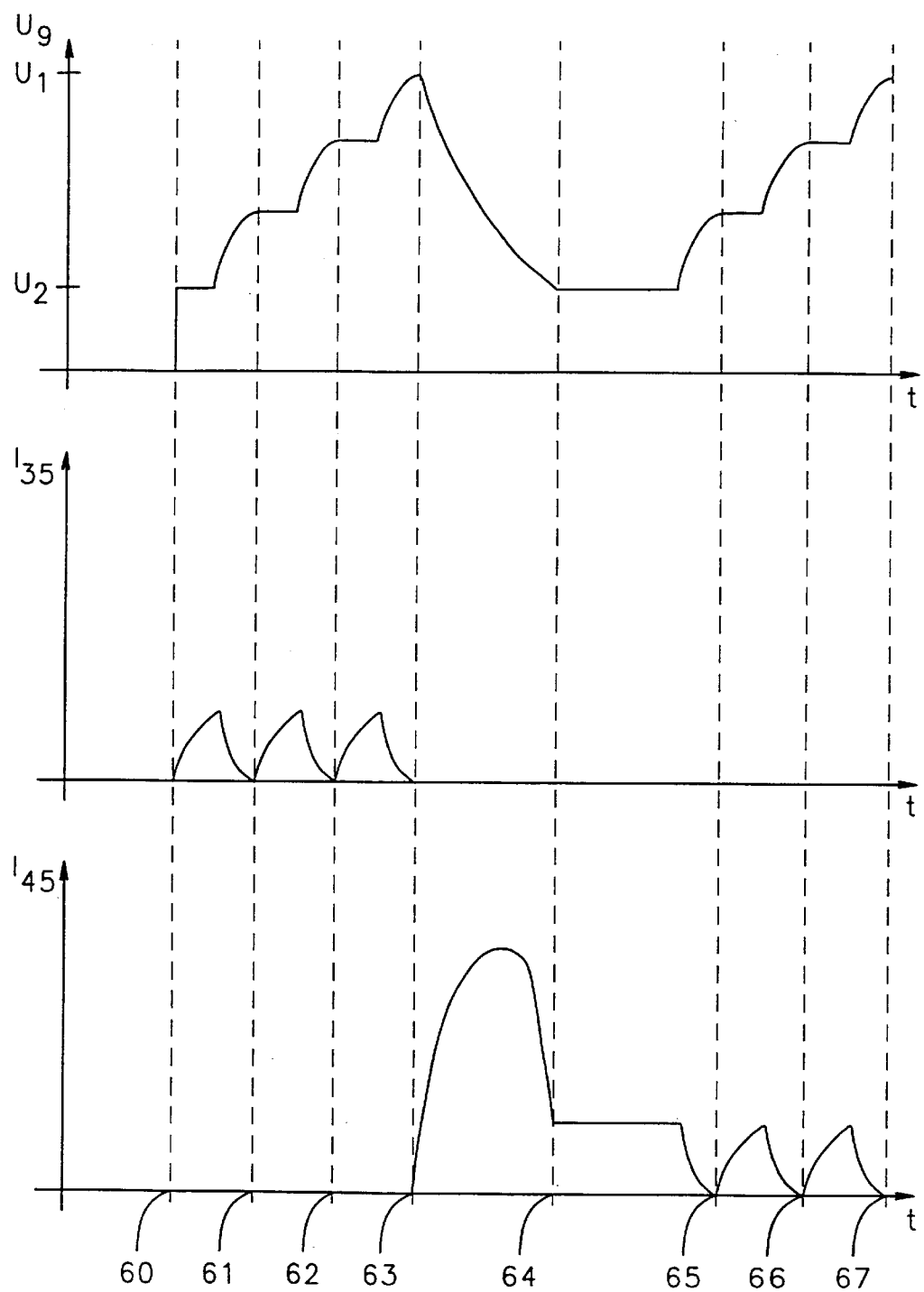
FIG. 6 is a graphical representation of voltage vs. time for the operation of the embodiment of FIG. 4 according to the invention.

FIG. 6 graphically depicts a plot of voltage vs. time in a first diagram, and two diagrams representative of current vs. time, for the operation according to the third embodiment of the invention, as previously explained with reference to FIGS. 4 and 5. The vertical broken lines represent a time relationship relative to certain points in time 60, 61, 62, 63, 64, 65, 66, 67 among the different diagrams. The 10 course of the signals in the diagrams is indicative of a failure of the battery 4, i.e., only the battery 16 with the nominal voltage $U_2$ which is lower than the nominal voltage $U_1$ of the battery 4 is available for the supply of power in the circuit arrangement. In such event, the switch 17 is permanently opened in order to avoid undesirable effects of the defective battery 4 upon the rest of the circuit arrangement.

The voltage $U_9$ at the capacitor 9 is represented in the upper diagram. The current $I_{35}$ is represented by the exciter winding 35, 36 in the middle diagram.

The current $I_{45}$ is represented by the exciter winding 45 in the lower diagram.

The process described below begins at the point in time 60 when the switches 8, 39, 40 are closed. This causes the voltage $U_9$ at the capacitor 9 to increase suddenly to the voltage $U_2$ of the battery 16. Furthermore, the current 135 rises gradually in accordance with an exponential function. After a certain period of time, in this case at the halfway point of the time period between the points in time 60, 61, the switches 39, 40 are opened, while the switch 8 remains closed. Such point in time is determined advantageously in that the rise of current $I_{35}$ takes place shortly before, or already within, the flattening branch of the exponential function. By switching off the switch 39, 40, the current 135 decreases in accordance with an exponential function. The energy quantity which is then transmitted via the diodes 41, 42 to the capacitor 9 results in a rise of the voltage $U_9$ therein, which also evolves according to an exponential function. At the point in time 61, the current 135 has essentially dropped to a value of zero. The above-described process is then repeated by again switching on the switch 39, 40, whereby the switch 8 is now opened in order to avoid a drop in the already raised voltage $U_9$ in the capacitor 9. About halfway through the period between the points in time 61, 62, the switches 39, 40 are then opened again and the switch 8 is at the same time closed. As a result, a further rise in the voltage $U_9$ is caused at the capacitor 9.

The process described above is subsequently repeated several times until the voltage $U_9$ attains a sufficient value for an actuation of the reluctance motor 18. This value is designated as voltage $U_1$ in FIG. 6. In accordance with the depiction of FIG. 6, only one additional repetition of the switching over of the switch 8, 39, 40 is shown, i.e., the capacitor voltage is raised in a total of three steps. Depending on the design of the reluctance motor 18 and of the capacitor 9, a number of switching-over processes greater or smaller than that shown in FIG. 6 may be required in order to achieve the desired voltage value at the capacitor 9.

At the point in time 63, the energy quantity accumulated in the capacitor 9 is transmitted to the reluctance motor 18 in order to cause a movement step of the rotor 20. In this case, the exciter winding 45 is supplied with the capacitor voltage $U_9$ by simultaneously closing the switches 8, 2, 3 when the switch (17) is open. As a result, a current $I_{45}$ builds up in the exciter winding 45, whereby the capacitor 9 is discharged.

The current $I_{45}$ increases at first, and then decreases again when it has reached a maximum. The voltage $U_9$ decreases between the points in time 63, 64 according to an exponential function. Starting with the point in time 64 when the voltage $U_9$ has dropped to the value $U_2$, the voltage $U_9$ is kept at this value $U_2$ because, from this point in time on, the current $I_{45}$ is again taken from the battery 16. From this point in time 64 on, the current $I_{45}$ therefore remains at a level caused by the voltage $U_2$ and the ohmic share of the exciter winding 45.

By virtue of the above-mentioned support by the battery 16 as of point in time 64, a movement of the rotor 20 is initiated because the relatively high capacitor voltage $U_9$ which is present at first can be continued until a movement step of the rotor 20 is completed, i.e. in the present case, until the stator poles 21, 31 are aligned with the rotor poles 26, 29. Thus, only a starting torque of the rotor 20 is produced by means of the capacitor voltage $U_9$. This feature therefore advantageously permits a relatively small and inexpensive capacitor with a comparatively low capacity to be used. Using a capacitor with low capacity provides the further advantage that only relatively few actuating steps of the switch are required in order to achieve a sufficient voltage at the capacitor 9.

Yet another advantage is that the capacitor voltage $U_9$ can be maintained at the value $U_2$ when the switch 8 is switched on, and does not therefore drop to value zero.

Shortly before point in time 65, the switches 2, 3 are then opened at the same time, and this causes a drop of the current $I_{45}$ and a rising capacitor voltage $U_9$ due to the energy equalization via the diodes 6, 7. When the process of energy equalization is completed at point in time 64, two switching steps are again carried out between the points in time 65, 66 to increase the voltage $U_9$ at the capacitor 9. The switches 2, 3 and 8 are thereby actuated alternatingly in a similar manner as was explained previously for the points in time 60, 61, 62, 63.

The preferred operation of the third embodiment of the invention already described above for the case of a functioning battery 4 can be expanded advantageously to provide a test mode for testing the additional battery 16 and the diode 5, as well as the circuit elements 2, 3, 6, 7, 8, 9, 12, 13, 14, 15, 39, 40, 41, 42 serving to collect the energy reserve. Since the battery 16 is provided as a redundancy for the contingency of a defect of the battery 4, the battery 16 is not used in the normal course of events when the battery 4 is operational. It cannot, therefore, be ascertained without further measures whether the battery 16 would be operational, as well, in the event that its use was required.

When the present invention is applied to a safety-critical device, for example, a braking device of a vehicle, it is, however, necessary for operational safety reasons to detect and to indicate any defect of the battery 16.

A preferred test mode for the testing of the battery 16 comprises the following steps:

The switch 17 is opened in a time phase in which the reluctance motor 18 need not carry out any actuating movement.

The energy quantity stored in the capacitor 9 is supplied to the exciter winding of the reluctance motor 18, the stator poles of which are, at least, nearly aligned with the rotor poles by closing the corresponding switches of the first switching device 2, 3, 12, 13, 39, 40. In this case, the rotor 20 executes essentially no movement, and the energy quantity stored in the capacitor 9 is converted into heat.

When the capacitor voltage $U_9$ has dropped to a voltage value $U_2$, an energy reserve is accumulated in steps in the capacitor 9 through alternating opening and closing of the first 2, 3, 12, 13, 39, 40 and second 8 switching devices. In this case, the capacitor voltage $U_9$ increases as shown also in FIG. 6.

When the capacitor voltage $U_9$ has reached at least a predetermined voltage value, for example, the voltage value $U_1$ after a predetermined time period, the battery 16 can be considered to be operational.

The switch 17 is then closed.

The capacitor voltage $U_9$ is monitored, in this case, preferably by the control module 10.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circuit arrangement for operating a solenoid actuator comprising:

an electrical energy supply device;

a first switching device via which the actuator is connectable to the energy supply device;

an energy feed-back device located between the energy supply device and the actuator for feeding back an energy quantity stored in the actuator into the energy supply device when the first switching device is opened, the energy supply device including at least one energy output device and at least one energy storage for transmitting and receiving energy; and a second switching device via which the energy storage is connectable to an energy feed-back device, such that a desired energy reserve is accumulated step by step in the energy storage by an alternating opening and closing of the first and the second switching devices, wherein the energy output device includes a main energy output device and an auxiliary energy output device parallel to the main energy output device, and wherein the step by step accumulation of the desired energy reserve in the energy storage is carried out in the event of defect or failure of the main energy output device.

2. A circuit arrangement according to claim 1, wherein the desired energy reserve is accumulated in the energy storage by opening the first switching device to stop the transfer of energy between the energy output device and the actuator, and by closing the second switching device to feed back energy stored in the actuator via the energy feed-back device to the energy storage, wherein the accumulated energy storage is subsequently transmittable to the actuator by simultaneously closing the first switching device and the second switching device, when required for operation of the actuator.

3. A circuit arrangement according to claim 2, wherein the first switching device comprises a first switch connected between a first side of the actuator and a first side of the energy supply device, and a second switch connected between a second side of the actuator and a second side of the energy supply device, both first and second switches of the first switching device opening and closing simultaneously, and wherein the energy feed-back device bridges the first switching device.

4. A circuit arrangement according to claim 3, wherein the energy feed-back device comprises a first diode and a second diode, the first diode being connected from the connection of the first switch and the first end of the actuator to the connection of the second switch and the second side of the energy supply device in the direction of flow, and the second diode being connected from the connection of the second switch and the second side of the actuator to the connection of the first switch and the first side of the energy supply device in the direction of flow.

5. A circuit arrangement according to claim 4, wherein the energy supply device comprises first and second circuits connected in parallel, the first circuit comprising the energy output device connected in series with an energy supply diode, and the second circuit comprising the energy storage connected in series with the second switching device, such that the energy supply diode is connected to the second switching device at the first side of the energy supply device, and the energy output device is connected to the energy storage at the second side of the energy supply device.

6. A circuit arrangement according to claim 5, wherein the energy output device is a battery, the energy storage is a capacitor, and the first and second switching devices are electronically controllable switches.

7. A circuit arrangement according to claim 1, wherein the energy reserve is accumulated step by step in the energy storage when the actuator produces an actuating force in combination with the energy output device that is below a desired value.

8. A circuit arrangement according to claim 7, wherein the first switching device is actuatable in such a manner that the actuator does not substantially execute any actuating movement for the step by step accumulation of the energy reserve in the energy storage.

9. A circuit arrangement according to claim 1, wherein at least on e of the main energy output device and the auxiliary energy output device is operable for output and not input of electrical energy.

10. A circuit arrangement according to claim 1, wherein at least one of the main energy output device and the auxiliary energy output device is provided with an energy source connected in series with a component which allows current to pass only in the direction of the energy feed-back device.

11. A circuit arrangement according to claim 10, wherein the energy source includes a rechargeable battery.

12. A circuit arrangement according to claim 1, wherein at least one of the main energy output device and the auxiliary energy output device is provided with an energy source to which an additional switching device is connected in series.

13. A circuit arrangement according to claim 12, wherein the energy source includes a rechargeable battery.

14. A circuit arrangement according to claim 1, wherein a nominal voltage of the auxiliary energy output device is substantially lower than a nominal voltage of the main energy output device.

15. A circuit arrangement according to claim 1, further comprising a control module which provides electronic control signals to the first and second switching devices.

16. A circuit arrangement according to claim 1, wherein the actuator is an electric motor.

17. A circuit arrangement according to claim 16, wherein the electric motor is a D.C. motor including an armature, a commutator and two electrical connections.

18. A circuit arrangement according to claim 16, wherein the electric motor includes exciter windings having electrical connections via which electrical energy is suppliable to said exciter windings.

19. A circuit arrangement according to claim 18, wherein:
the electric motor includes rotor poles and stator poles corresponding to the exciter windings; and
the first switching device is actuatable in such manner for the step by step accumulation of the energy reserve in the energy storage that particular ones of the exciter windings of the electric motor whose stator poles are closest to the rotor poles are connected to the energy output device.

20. A circuit arrangement according to claim 18, wherein the first switching device is actuatable in such manner for the step by step accumulation of the energy reserve in the energy storage that several or all exciter windings of the electric motor are connectable at the same time to the energy output device.

21. A circuit arrangement according to claim 16, wherein the electric motor is a switched reluctance motor.

22. A circuit arrangement according to claim 1, wherein the actuator is a solenoid.

23. A circuit arrangement according to claim 22, wherein the solenoid comprises a solenoid valve.

24. A method of operating a solenoid actuator, comprising:
connecting the actuator in a circuit arrangement including an electrical energy supply device, a first switching device via which the actuator is connectable to the electrical energy supply device, an energy feed-back device located between the energy supply device and the actuator which feeds back an energy quantity stored in the actuator into the energy supply device when the first switching device has been opened, the energy supply device including at least one energy output device and at least one energy storage for transmitting and receiving energy, and a second switching device via which the energy storage is connectable to the energy feed-back device; and
alternating opening and closing the first and the second switching devices such that a desired energy is accumulated step by step in the energy storage,
wherein the energy output device includes a main energy output device and an auxiliary energy output device parallel to the main energy output device, and wherein the step by step accumulation of the desired energy in the energy storage is carried out in the event of defect or failure of the main energy output device.

25. A method of operating a solenoid actuator, comprising:
connecting the actuator to an electrical energy source;
disconnecting the actuator from the electrical energy source and feeding back an energy quantity stored in the actuator into an energy storage; and alternating repeating said steps of connecting and disconnecting, whereby a desired energy reserve is accumulated step by step in the energy storage, wherein the electrical energy source includes at least one energy output device and an auxiliary energy output device parallel to the main energy output device, and wherein the step by step accumulation of the desired energy reserve in the energy storage is carried out in the event of defect or failure of the main energy output device.

26. A method according to claim 25, wherein:

the actuator is an electric motor including exciter windings, rotor poles and stator poles corresponding to the exciter windings; and only the exciter windings of the electric motor whose stator poles are closest to the rotor poles are connected to the auxiliary energy source in said step of connecting.

27. A method according to claim 25, further comprising:

transmitting the energy reserve collected in the energy storage to the actuator when required for operation thereof.

28. A method according to claim 25, wherein the energy reserve is accumulated step by step in the energy storage when the actuator produces an actuating force in combination with the energy output device that is below a desired value.

29. A method according to claim 25, wherein said step of connecting does not substantially execute any actuating movement of the actuator.

30. A method according to claim 25, wherein:

the electrical energy source is an auxiliary energy source; and the step by step accumulation of the energy reserve in the energy storage is carried out in the event of operational failure of a main energy source.

31. A method according to claim 30, wherein a nominal voltage of the auxiliary energy source is substantially lower than a nominal voltage of the main energy source.

32. A method according to claim 25, wherein:

the actuator is an electric motor having exciter windings; and said step of alternatingly repeating includes connecting several or all exciter windings of the electric motor at the same time to the electrical energy source.

* * * * *